(12) United States Patent
Bernstein

(10) Patent No.: US 7,765,496 B2
(45) Date of Patent: Jul. 27, 2010

(54) SYSTEM AND METHOD FOR IMPROVING THE NAVIGATION OF COMPLEX VISUALIZATIONS FOR THE VISUALLY IMPAIRED

(75) Inventor: Howard B. Bernstein, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 11/618,707

(22) Filed: Dec. 29, 2006

(65) Prior Publication Data

US 2008/0163123 A1 Jul. 3, 2008

(51) Int. Cl.
*G06F 3/00* (2006.01)
(52) U.S. Cl. .......................... 715/865; 715/764; 715/853
(58) Field of Classification Search .................. 715/853, 715/865, 764
See application file for complete search history.

(56) References Cited

U.S. PATENT DOCUMENTS

| | | | | |
|---|---|---|---|---|
| 5,414,809 | A * | 5/1995 | Hogan et al. | 715/765 |
| 5,740,390 | A | 4/1998 | Pickover et al. | |
| 5,983,184 | A * | 11/1999 | Noguchi | 704/270 |
| 5,991,781 | A | 11/1999 | Nielsen | |
| 6,216,134 | B1 * | 4/2001 | Heckerman et al. | 707/104.1 |
| 6,509,898 | B2 | 1/2003 | Chi et al. | |
| 6,801,229 | B1 * | 10/2004 | Tinkler | 715/853 |
| 6,856,333 | B2 | 2/2005 | Ullmann et al. | |
| 6,961,458 | B2 * | 11/2005 | Dutta et al. | 382/154 |
| 6,999,066 | B2 * | 2/2006 | Litwiller | 345/173 |

(Continued)

*Primary Examiner*—William L Bashore
*Assistant Examiner*—Gregory A Distefano
(74) *Attorney, Agent, or Firm*—Daniel McLoughlin; Hoffman Warnick LLC

(57) ABSTRACT

The present invention relates to a system and method for improving the navigation of complex visualizations on a computer display for the visually impaired persons to toggle between objects or nodes. An object or node may be a square, a circle or other object which a display screen may show. The objects or nodes have characteristics which may include a name which indicates the name of the node, a direction which indicates the direction of the next node to progress to (along an arc), priority which indicates the priority that the node has with respect to other nodes, properties which indicates the certain properties of the node, and operation which indicates the operation to be performed. The system has a user indicator for indicating to the visually impaired user the characteristics of the objects or nodes which are connected by arcs. The node or object characteristics are informed to the user by the indicator to allow the user to toggle from one node to the other along the arc route. The system has a control center which has a receiver for receiving the toggle commands and node characteristics from each node. The toggle command moves a selector (which selects which object is being acted upon—sometimes, for visually unimpaired people, the selected object is shown in bold or a distinct color) to the next node according to the characteristics. The receiver also passes the node characteristics to a parser. The parser parses the node characteristics and passes it on to the director for determining the next step. The director examines the characteristics, such as name, direction, properties, and operations, and indicates to the user the characteristics of the node—generally by audible means but not so limited. This allows the visually impaired user to ascertain where he/she on the display. This is generally done by way of an audible device but could be accomplished in other ways.

8 Claims, 12 Drawing Sheets

Starting diagram of complex graph.
Focus is on node 1.

U.S. PATENT DOCUMENTS

| | | |
|---|---|---|
| 7,051,096 B1 * | 5/2006 | Krawiec et al. ............. 709/223 |
| 7,103,551 B2 * | 9/2006 | King et al. ................. 704/271 |
| 2002/0003547 A1 | 1/2002 | Wang et al. |
| 2002/0122053 A1 * | 9/2002 | Dutta et al. ................. 345/729 |
| 2003/0036909 A1 * | 2/2003 | Kato ........................ 704/275 |
| 2004/0016803 A1 | 1/2004 | Cummings |
| 2004/0051746 A1 | 3/2004 | Litwiller |
| 2005/0111644 A1 | 5/2005 | Edwards |
| 2005/0179565 A1 * | 8/2005 | Mase et al. ................... 341/21 |
| 2007/0255569 A1 * | 11/2007 | Baker ........................ 704/270 |

* cited by examiner

Acyclic graph

Directed graph (with cycle)

Two types of nodes (square and circle) with labels. Square node has "expand" icon Directed acyclic graph Directed graph with multiple arcs emerging from the first node Node with child nodes and "collapse" icon Node with additional properties
shown in the visualization A visually unusable layout,
but one that is semantically accurate Node with multiple
connection points Starting diagram of complex graph.
Focus is on node 1.

Two types of arcs,
one named and with roles

Diagram state after right cursor.
Focus is on node 2.

Diagram state after right cursor.
Focus is on arcs connecting node 2 to node 3

Diagram state after down cursor.
Focus is on arc connecting node 2 to node 3.

Diagram state after right cursor.
Focus is on node 3

Starting state of diagram with 5 nodes and 4 arcs.
Focus is on arcs leaving node 2.

Diagram state after left cursor.
Focus is on node 2.

Diagram state after left cursor.
Focus is on arcs leading to node 2.

Diagram state after down cursor.
Focus is on arc connecting node 1 to node 2

Diagram state after left cursor.
Focus is on node 1.

Starting state of diagram with 5 nodes and 4 arcs.
Focus is on node 2.

Diagram state after down cursor.
Focus is on property group in node 2.

Diagram state after down cursor
Focus on Operations group in node 2.

Diagram state after right cursor.
Focus on Operation 2 in Operations group in node 2.

Starting diagram with 5 nodes and 4 arcs.
Focus is on node 2.

Diagram state after
Alt-p shortcut to first property.

Starting state of diagram with 5 nodes and 4 arcs.
Focus is on node 1.

Diagram State after short-cut
to move to Node D.

SYSTEM AND METHOD FOR IMPROVING THE NAVIGATION OF COMPLEX VISUALIZATIONS FOR THE VISUALLY IMPAIRED

FIELD OF THE INVENTION

The invention relates generally to navigation in software applications, and, more particularly, to a system and method for improving the navigation of complex visualizations for the visually impaired.

BACKGROUND OF THE INVENTION

Complex visualizations are graphical user interfaces consisting of graphs, charts, maps and other highly visual presentations of information in a format other than that provided by standard widget sets that include widgets such as text, list, tree, table, etc. They are designed to take advantage of a user's ability to process a large amount of 2- or 3-dimensional information using sight and manipulate it directly with a pointing device.

Over the past decade, as computational speed has increased and high-resolution output devices have become more affordable, an ever increasing number of applications have come to rely on complex visualizations to both convey and support manipulation of complex information. While the expressive and efficient nature of these visualizations has been beneficial to the average user, people with disabilities have been faced with gradual erosion in their ability to interact with applications, and more importantly with their professional peers. When text editors were the prevailing tool used by software practitioners, people with disabilities could be extremely competitive in this industry. With the introduction and broad adoption of visual editors, people with visual disabilities, and to a lesser extent people who have limited use of their hands, can no longer compete as effectively in this field.

The most often used complex visualization applications by software industry practitioners are those considered to be part of a class of applications known as visual editors. Some examples of interfaces for these applications which are relevant to software industry practitioners include flowcharting and UML modeling, workflow specification, and software configuration management. However, the problems associated with these applications are also present in any object drawing application, for example Microsoft® PowerPoint or IBM Lotus® Freelance Graphics.

Accessibility of complex visualizations is not a given. Traditional interface widgets are often accessible without significant additional effort because the underlying GUI toolkit provides keyboard navigability within and between the widgets, and an accessibility API implementation that allows assistive devices to query the widgets and communicate their data in an appropriate manner to disabled users. (In computer programming, a widget (or control) is an interface element that a computer user interacts with, such as a window or a text box. Widgets are sometimes qualified as virtual to distinguish them from their physical counterparts, e.g. virtual buttons that can be clicked with a mouse cursor, vs. physical buttons that can be pressed with a finger. Widgets are often packaged together in widget toolkits. Programmers use widgets to build graphical user interfaces (GUIs).) In contrast, complex visualizations are often constructed from primitive graphical elements that are not inherently accessible. It then becomes necessary for the application developer to understand the underlying accessibility API and essentially duplicate the efforts of the GUI toolkit authors to implement basic accessibility. This effort is similar to creating a custom widget to represent the objects in the visualization.

However, on some platforms the application developer may be fortunate enough to have a 2-d or 3-d graphics toolkit that has already implemented accessibility interfaces. One such toolkit is the Graphics Editing Framework (GEF). Built upon the Standard Widget Toolkit (SWT) based draw2d package, GEF offers an accessible toolkit for developing complex visualizations for the Eclipse framework, or outside Eclipse in standalone SWT applications. GEF has already implemented accessible widgets to represent the elements of complex visualizations. While GEF provides this basic framework for accessibility, it remains the responsibility of the application developer to ensure that each element of the visual display is adequately expressed through the accessibility interface to accommodate the needs of the visually impaired user. More information on GEF can be found here: http://wiki.eclipse.org/index.php/Graphical_Editing_Framework. More information on Eclipse can be found here: http://wiki.eclipse.org/index.php/Main_Page. More information on SWT can be found here: http://www.eclipse.org/swt/.

Users with motor impairment require alternative devices to enable navigation and initiate operations, and keyboard accessibility (along with filter keys and sticky keys) typically satisfies this requirement. The challenges for users that are visually impaired are significantly greater. Complex visualizations rely on the visual comprehension of the user to convey most if not all of the information critical to understanding. When visual comprehension is impossible, all information must be conveyed to the user via screen readers. Screen reader technology is generally limited to interacting with the accessibility programming interface on a given operating system or programming platform. By default, a screen reader can voice only the information provided by the application programmer. Therefore a critical aspect of creating an accessible complex visualization is providing coherent, meaningful text to the accessibility programming interface. With additional scripting, screen readers can be customized for specific applications to improve the efficiency and comprehension of voiced information. However, a well-implemented application accessibility model can reduce or eliminate the need to provide custom scripts for screen reader applications.

Satisfying the requirements of accessibility standards is only the first step toward producing a usable complex visualization. Where sighted users can typically distinguish between the different types of objects in a complex visualization by merely looking, visually impaired users must navigate around the objects and build a mental model of the visualization in their minds. Where sighted users can directly navigate to any desired object simply by moving the cursor and clicking on it with the mouse, visually impaired users must traverse the objects along an ordered path defined by the application programmer until they reach the object of their desire. Where sighted users point and click, visually impaired users must learn and recall a potentially complicated keyboard navigation scheme which may include a large set of keyboard shortcuts to navigate complex visualizations. The inherent inefficiency of the interaction faced by visually impaired users, compounded by the typical complexity of a complex visualization, begs for a concerted effort at improving the usability of such an application.

In view of the foregoing, a need exists to overcome these problems by providing a system and method for improving the navigation of complex visualizations for the visually impaired.

BRIEF SUMMARY OF THE INVENTION

The present invention relates to a system and method for improving the navigation of complex visualizations on a computer display for the visually impaired persons to toggle between objects or nodes. An object or node may be a square, a circle or other object which a display screen may show. The objects or nodes have characteristics which may include a name which indicates the name of the node, a direction which indicates the direction of the next node to progress to (along an arc), priority which indicates the priority that the node has with respect to other nodes, properties which indicates the certain properties of the node, and operation which indicates the operation to be performed. The system has a user indicator for indicating to the visually impaired user the characteristics of the objects or nodes which are connected by arcs. The node or object characteristics are informed to the user by the indicator to allow the user to toggle from one node to the other along the arc route. The system has a control center which has a receiver for receiving the toggle commands and node characteristics from each node.

The toggle command moves a selector (which selects which object is being acted upon—sometimes, for visually unimpaired people, the selected object is shown in bold or a distinct color) to the next node according to the characteristics. The receiver also passes the node characteristics to a parser. The parser parses the node characteristics and passes it on to the director for determining the next step. The director examines the characteristics, such as name, direction, properties, and operations, and indicates to the user the characteristics of the node—generally by audible means but not so limited. This allows the visually impaired user to ascertain where he/she on the display. This is generally done by way of an audible device but could be accomplished in other ways.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

Perhaps one of the most difficult aspects of comprehending a complex visualization is relating that visualization to a meaningful model that describes the purpose of each object and why they might be related to one another. In most cases, this is managed outside the context of the application proper, in documentation accompanying the application, or sometimes in books that describe the semantics of the model in great detail.

Each element of a graph can have a variable number of objects or groups of objects associated with it. Some objects may be part of the focused element; others may form a relationship between elements. While navigation between and around traditional widgets is well understood and implemented by the GUI toolkit, navigation of complex visualizations can only be accomplished through the efforts of the toolkit programmer (as with GEF) or the application programmer. The following is background illustrating the various elements of complex visualizations to lay the groundwork for the explaining the solutions of the present invention.

Figure 1:
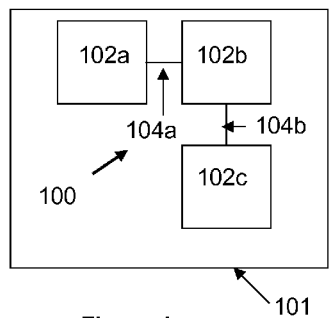
FIG. 1 depicts a complex visualization in the form of an acyclic graph.

The simplest form of complex visualization is an acyclic graph (shown in FIG. 1) 100 (displayed on Display 101) which consists of nodes 102a, b, c interconnected by arcs (a.k.a., edges, relationships or connections) 104a, b where no path through the graph starts and ends at the same node. Each node or object may be a square, object or any other object shown on the display.

Figure 2:
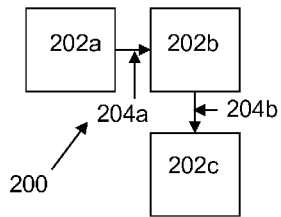
FIG. 2 depicts a complex visualization in the form of a directed acyclic graph.

Directed acyclic graphs (shown in FIG. 2, also known as DAGs) 200 have directional arcs 204a, b where each arc can be followed from one node 202a, b, c to another.

Figure 3:
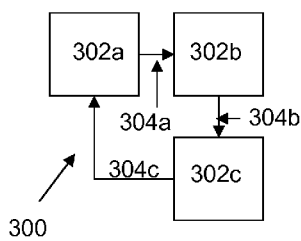
FIG. 3 depicts a complex visualization in the form of a directed acyclic graph forming a cycle.

In any ordered navigation of an acyclic directed graph, the user should reach a terminal node as indicated by his inability to navigate further using the same command. The existence of a cycle 300 in the graph (shown in FIG. 3), while clearly visible to the sighted user, might cause a visually impaired user to continuously navigate around the cycle from nodes 302a, b, c via directional arcs 304a, b, c without realizing it.

Figure 4:
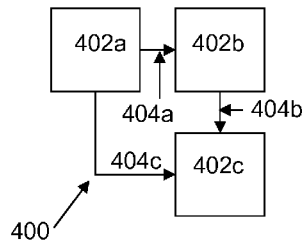
FIG. 4 depicts a directed graph with multiple arcs emerging from a single node.

Decision points in a graph 400, where multiple arcs emerge from a single node 402a to 402b and 402c, must allow the user to choose an arc to traverse to continue navigation of the graph (from node 402a shown in FIG. 4).

Likewise merge points, where multiple arcs enter a single node 402c, must allow the user to choose an arc when navigating in the reverse direction (from Node 402c shown in FIG. 4).

Figure 5:
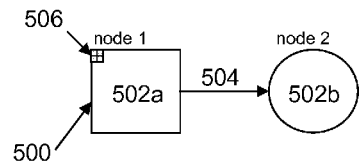
FIG. 5 depicts a complex visualization having two types of nodes, a square and a circle, with labels.

The simplest form of node represents a single object and is typically both named and typed. Sighted users often recognize type from the shape of the object (e.g., square 502a and circle 502b), or an icon associated with the object, and the object is often labeled with its name (Node 1 502a and Node 2 502b shown in FIG. 5).

Figure 6:
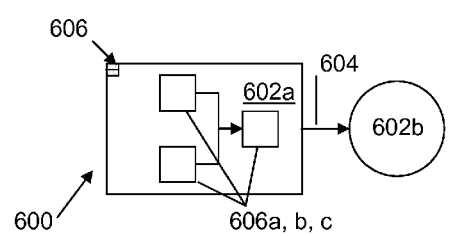
FIG. 6 depicts a complex visualization having two types of nodes, a square and a circle, with labels, and the square node having child nodes and an "expand" icon.

Nodes may also represent an aggregation of child nodes. Sighted users may see an icon 506, 606 indicating that the node 502a, 602a may be expanded to show its child nodes (as in a tree) 606a, b, c. Upon expansion, the child nodes 606a, b, c may replace the current view entirely, or be shown within the now expanded node in the same context. In some cases the child nodes 608a, b, c may always be visible within boundaries of the parent node 602a (shown in FIGS. 5 and 6).

Figure 7:
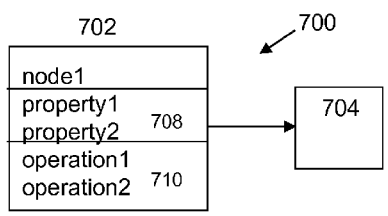
FIG. 7 illustrates a node having additional properties shown in the visualization.

Nodes (702) may also contain and display additional properties or lists of properties 708 (e.g. operations 710 and attributes in, e.g., IBM® Rational® Rose class diagrams) (shown in FIG. 7)).

Figure 8:
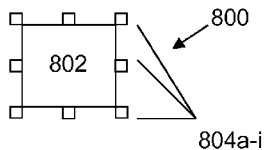
FIG. 8 illustrates a node having multiple connection points shown in the visualization.

A node 802 may serve as a single connection point for many arcs connecting to it, or may have multiple connection points 804a-i (shown in FIG. 8), from which the user must choose when creating arcs. Connection points 804a-i may always be visible, or may only be visible when the pointing device is hovering over that location on the node. Connection points 804a-i may be semantically relevant, for example in logic or electrical diagrams.

Figure 9:
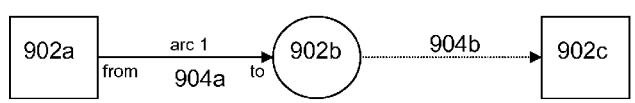
FIG. 9 illustrates two types of arcs, one named and with roles.

The simplest form of arc is unnamed and connects two nodes. Arcs may be directional (unidirectional or bidirectional), or have no stated direction (no arrow or other distinguished endpoint). Arcs 904a, b may be named ("arc 1") and typed (shown in FIG. 9 as "solid" 904a and "dotted" 904b). An arc 904a, b may have roles that describe its relationship to the nodes at each end of the arc (shown in FIG. 9 "from" and "to).

Figure 10:
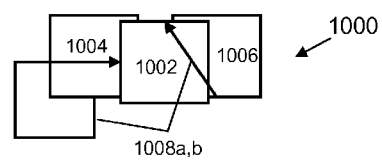
FIG. 10 illustrates a complex visualization which is semantically accurate but visually unusable.

Any complex visualization that is expected to be created or edited by visually impaired users must have one or more automated layout algorithms. While physical layout is generally unimportant to blind users, they are often sharing visualizations with sighted users and therefore must create visually usable layouts. It would be unreasonable to expect a visually impaired user to memorize or visualize the physical location of objects and create new objects in an appropriate physical location, or expect a sighted user to comprehend the visual organization of objects that have not been located in a visually understandable manner. FIG. 10 illustrates a layout 1000 which has three nodes 1004, 1006, 1008 having a directional arc from node 1004 to node 1002 and a directional arc from node 1006 to node 1002. The layout is semantically correct but visually unusable.

Editable visualizations often have palettes of editing tools associated with them. To create new objects, the user must navigate to the palette, select a tool, and then click on the visualization's drawing area, or on an existing object, or on a sequence of objects. Sometimes the user must drag an object from the palette onto the surface or another object. Palettes, while both visually appealing and a device to immediately expose object types and a creation paradigm to the sighted user, presents some serious difficulties for the visually impaired user. The use of palette tools often causes the application to enter a mode requiring the completion of a specific sequence of steps to complete the operation or exit the mode.

The following description details solutions of the present invention to the usability issues highlighted by the challenges outlined above. The solutions and references to specific attributes of an object assume the presence of the Microsoft® Active Accessibility® (MSAA) architecture, or something similar. MSAA is the accessibility architecture for the Windows operating system. It defines the interfaces through which an application program and an assistive technology device (such as a screen reader) communicate. In order for assistive technologies (AT) to convey meaningful information to users about an application's user interface, the AT first must be able to access that information from the application. MSAA is a technology that provides a standard, consistent mechanism for exchanging information between applications and assistive technologies. For example, MSAA allows applications to expose screen readers to the type, name, location, and current state of all objects and notifies screen readers of any Windows® event that leads to a user interface change.

Eclipse uses MSAA (on Windows) to make the SWT widgets and GEF accessible to assistive technologies. For example, the accessible Name, accessible Role and other properties referred to below are MSAA properties. Other platforms, such as Gnome and Apple provide similar accessibility services.

Both sighted and visually impaired users usually have some knowledge of the model before attempting to interact with the application. For users with disabilities, it is essential that accessible online help describing the semantics of the application and keyboard equivalents for direct manipulation of objects within the application is available.

If the object itself is unnamed, the accessible Name property should reflect its purpose. For example, the accessible Name property of an unnamed arc should be "Arc between node 1 and node 2", where node 1 and node 2 are the names of the nodes at either end of the arc. For nodes, this may simply be the name of the node.

Directed graphs usually contain both nodes and arcs, and in an application these nodes and arcs may have specific object type names. By including the basic type in the Role, the user can be certain of the general classification of that object, e.g., "Activity Node" or "Association Arc".

If the object has a description set by the user, this should be prefixed to the programmatically generated description for the accessible interface. If prefixing the user-provided description is not desired, or in addition to adding the generated text to the user-provided description, an alternative means of voicing the description must be implemented. For example, a keyboard sequence could be defined to give temporary focus to a non-visible field whose accessible Name contains the generated text. If among the child object groups are arcs, the generated description should mention each of the arcs and the objects to which they are related. For example, "You are on the nodename node of type nodetype. There are five relationships from this node to other nodes. The nodename node of type nodetype is related by an arc of type arctype. The nodename node of type nodetype . . . ". If the accessibility API does not contain an accessible property for shortcut key, the accessible description should include the shortcut key sequence.

The overview should describe the complexity of the visualization instance in terms of the number and types of nodes and arcs, to give the user some idea of how large or complex the visualization may be. As with each object's accessible Description, this could be in addition to or an alternative to a user provided description. All other accessible properties for this widget should be set as well.

For example, if elements of the visualization can be expanded and collapsed, and the accessibility API supports an expanded and collapsed state for a widget, the application should ensure that the state is correctly set.

Ensuring that the navigation model is simple, consistent and stable will assist visually impaired users in creating a mental model of the visualization, and will benefit all users of the visualization. Specific examples are described below:

Use left and right cursor keys for traversing between nodes connected by single arcs.

If a node has multiple incoming or outgoing arcs, the left or right cursor key will give focus to the group or incoming or outgoing arcs respectively. Once an arc group focus is achieved, the up or down cursor keys will navigate to each arc. Once an arc focus is achieved the left or right arrow keys will traverse the arc in the appropriate direction to whether it is incoming or outgoing. For directional arcs the left arrow key will always traverse to the source node, and the right arrow key will always traverse to the destination node. Non-directional arcs will all behave as outgoing arcs.

If a node has other objects contained within it, either child nodes or properties, each type constitutes a group. Use up and down cursor keys for traversing between a node and its child objects by group. Once a child object group focus is achieved with the up or down cursor key, the left and right cursor keys give focus to each object in the group. When there is only one possible destination, down cursor and right cursor can be synonymous and left cursor and up cursor can be synonymous.

Figure 11:
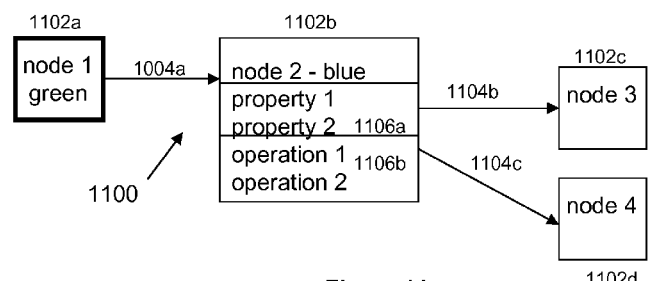
FIG. 11 illustrates a complex visualization where focus is on node 1.

The following series of diagrams shows simple navigation of a complex graph using the cursor keys. FIG. 11 shows the starting state. Selection is shown by a thick black border around node 1 1102a. The diagram 1100 is described in the text below:

Focus: node 1 (1102a)
Accessible Name: "node 1"
Accessible Role: "green square"
Accessible Description: "You are on node1 of type green square. There is one outgoing relationship to node 2 (1102b) of type blue square."
User input to next diagram: right cursor.

Figure 12:
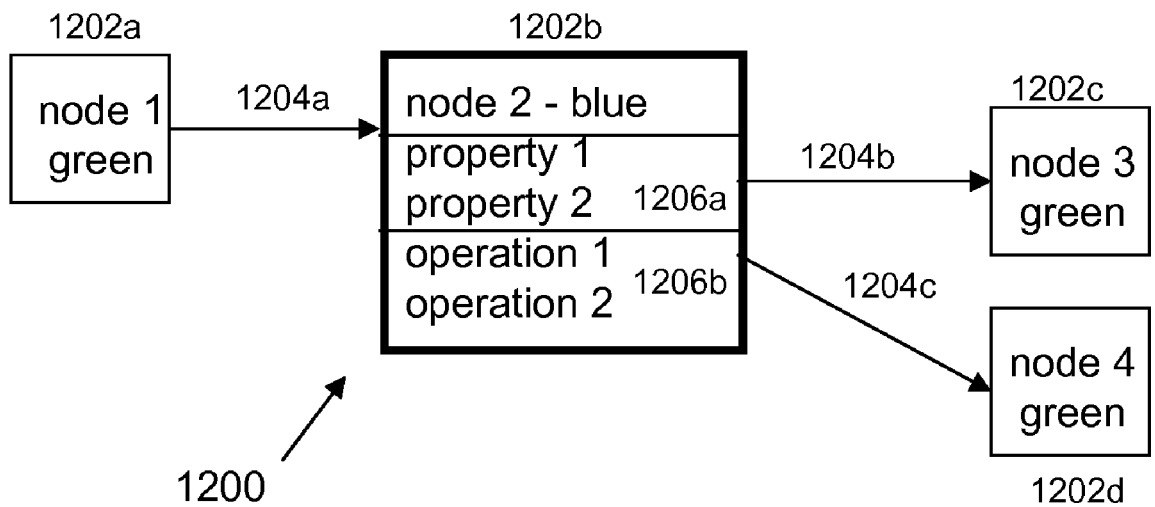
FIG. 12 illustrates a complex visualization where focus is on node 2.

FIG. 12 illustrates the diagram 1200 is described in the text below:

Focus: node 2 (1202b)
Accessible Name: "node 2"
Accessible Role: "blue square"
Accessible Description: "You are on node 2 of type blue square. There is 1 incoming relationship from node 1 of type green square, and 2 outgoing relationships to node 3 of type green square and node 4 of type green square. This node has 2 properties and 2 operations."
User input to next diagram: right cursor and node 4.

Figure 13:
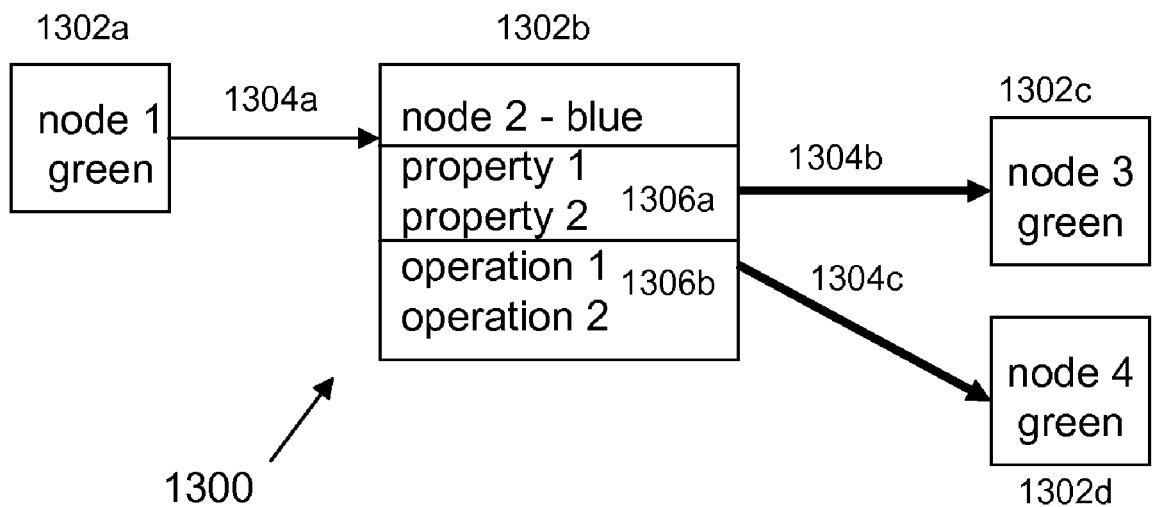
FIG. 13 illustrates a complex visualization where focus is on arcs connecting node 2 to nodes 3 and 4.

FIG. 13 illustrates the diagram 1300 is described in the text below:

Focus: outgoing arc group (1304b, c)
Accessible Name: "outgoing relationships from node 2"
Accessible Role: "relationship group"
Accessible Description: "2 outgoing relationships to node 3 of type green square and node 4 of type green square"
User input to next diagram: down cursor (or right cursor)

Figure 14:
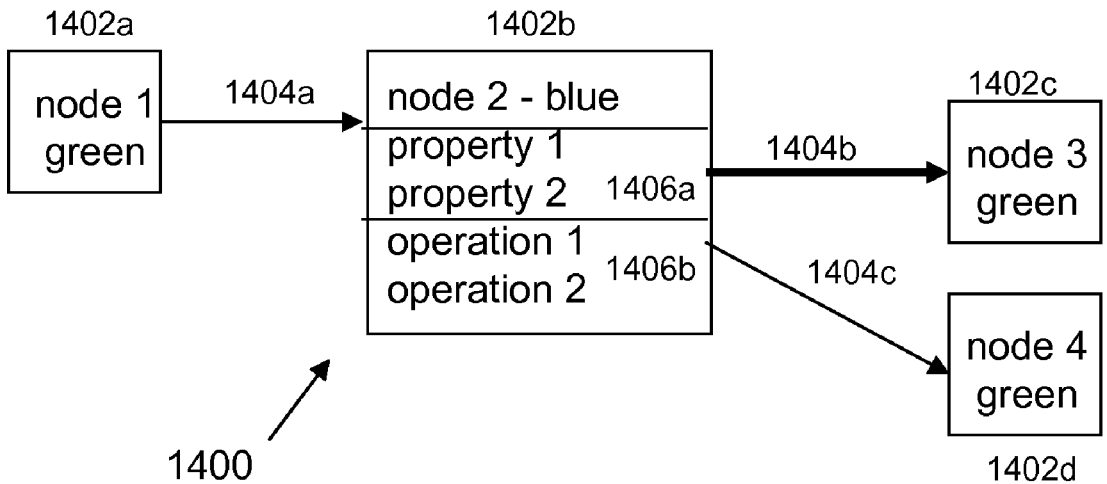
FIG. 14 illustrates a complex visualization where focus is on the arc connecting node 2 to node 3.
Figure 15:
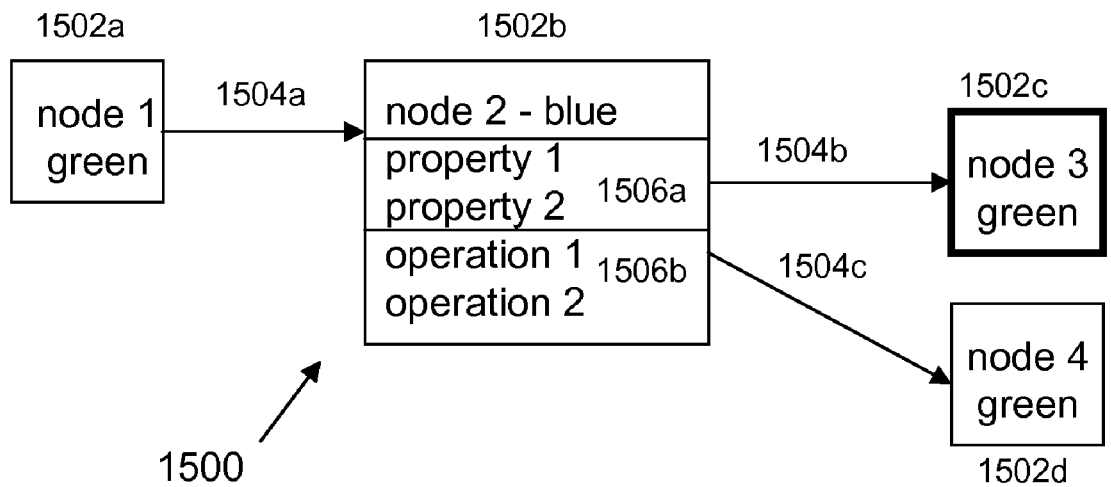
FIG. 15 illustrates a complex visualization where focus is on node 3.
Figure 16:
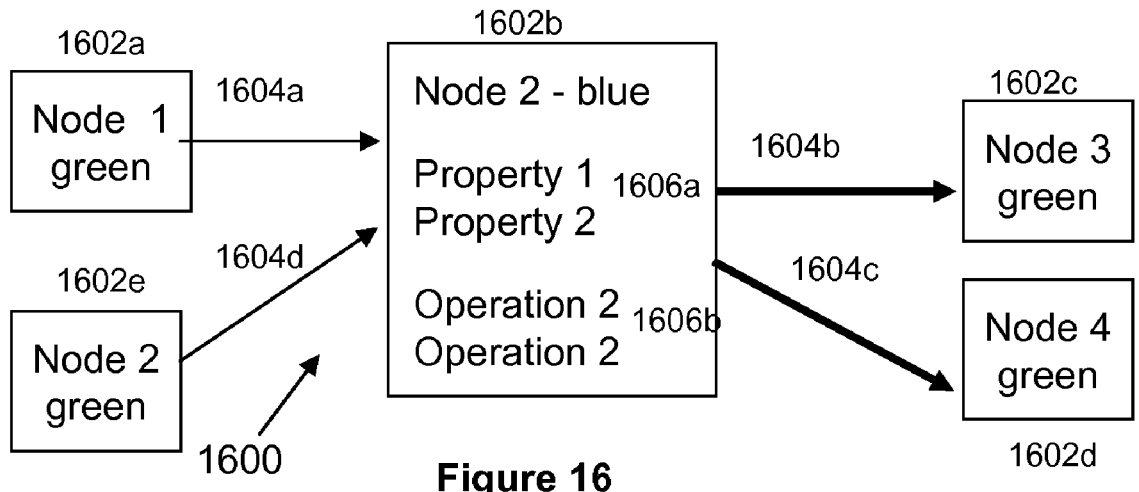
FIG. 16 illustrates a complex visualization where focus is on arcs connecting node 2 to nodes 3 and 4.

FIG. 14 illustrates the diagram 1400 is described in the text below:

Focus: outgoing arc between node 2 and node 3
Accessible Name: "relationship from node 2 to node 3"
Accessible Role: "relationship"
Accessible Description: "relationship from node 2 of type blue square to node 3 of type green square"
User input to next diagram: right cursor FIG. 15 illustrates the diagram 1500 is described in the text below:

Focus: node 3 1502c
Accessible Name: "node 3"
Accessible Role: "green square"
Accessible Description: "You are on node 3 of type green square. There is one incoming relationship from node 2 of type blue square."
User input to next diagram: left cursor FIG. 16 illustrates the diagram 1600 is described in the text below:

Focus: outgoing arc group (1604b, c)
Accessible Name: "outgoing relationships from node 2"
Accessible Role: "relationship group"
Accessible Description: "2 outgoing relationships to node 3 of type green square and node 4 of type green square"
User input to next diagram: down cursor (or right cursor).

Figure 17:
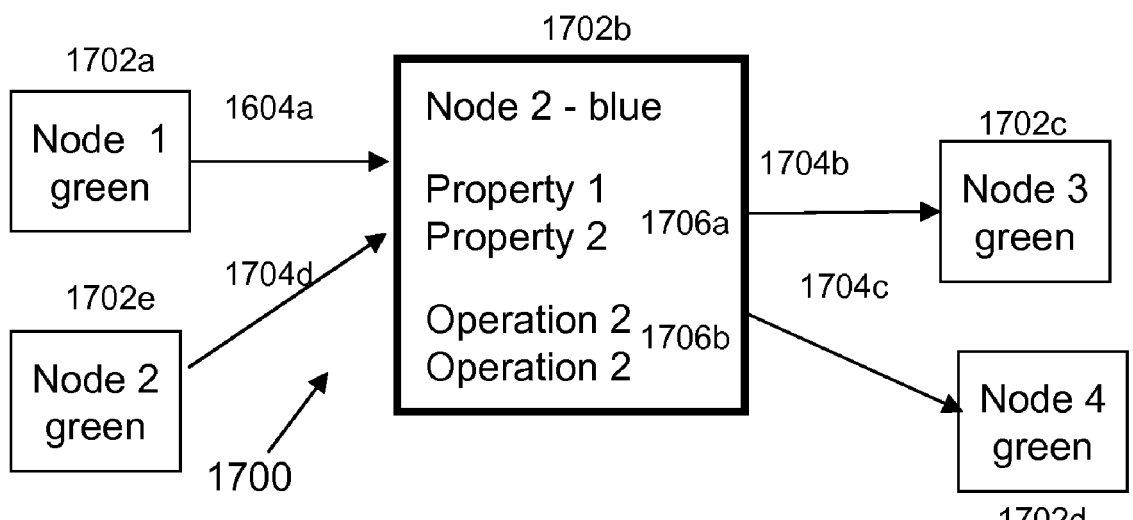
FIG. 17 illustrates a complex visualization where focus is on node 2.
Figure 18:
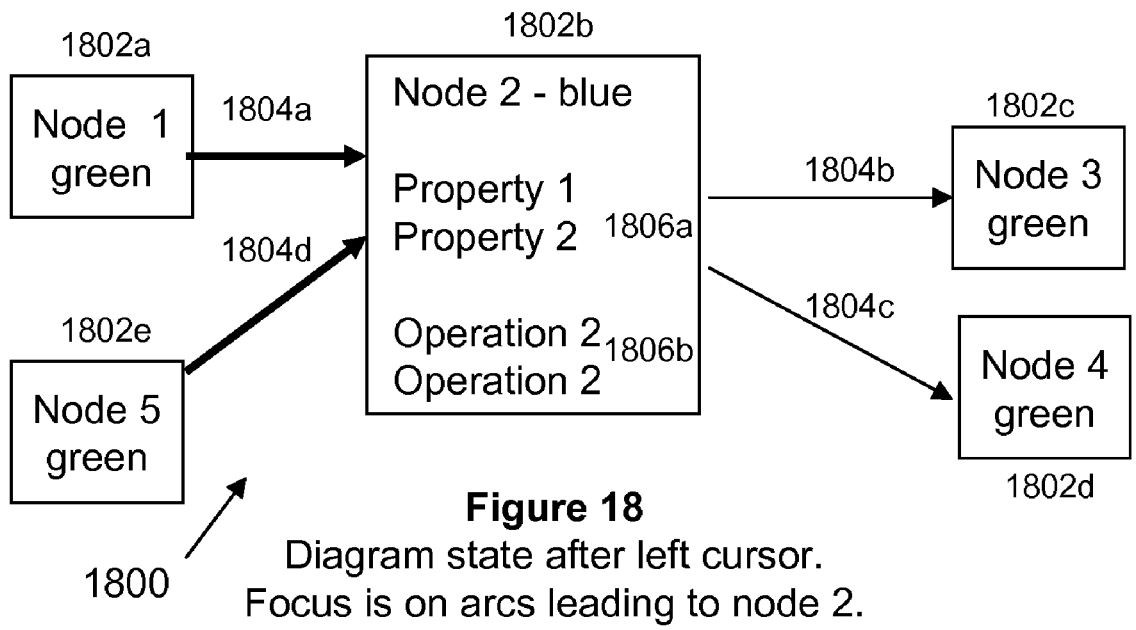
FIG. 18 illustrates a complex visualization where focus is on arcs connecting nodes 1 and 5 to node 2.

FIG. 17 illustrates the diagram 1700 is described in the text below:

Focus: node 2 (1202b)
Accessible Name: "node 2"
Accessible Role: "blue square"
Accessible Description: "You are on node 2 of type blue square. There are 2 incoming relationships from node 1 of type green square and from node 5 of type green square, and 2 outgoing relationships to node 3 of type green square and node 4 of type green square. This node has 2 properties and 2 operations."
User input to next diagram: left cursor FIG. 18 illustrates the diagram 1800 is described in the text below:

Focus: incoming arc group (1804a, d)
Accessible Name: "incoming relationships to node 2"

Figure 19:
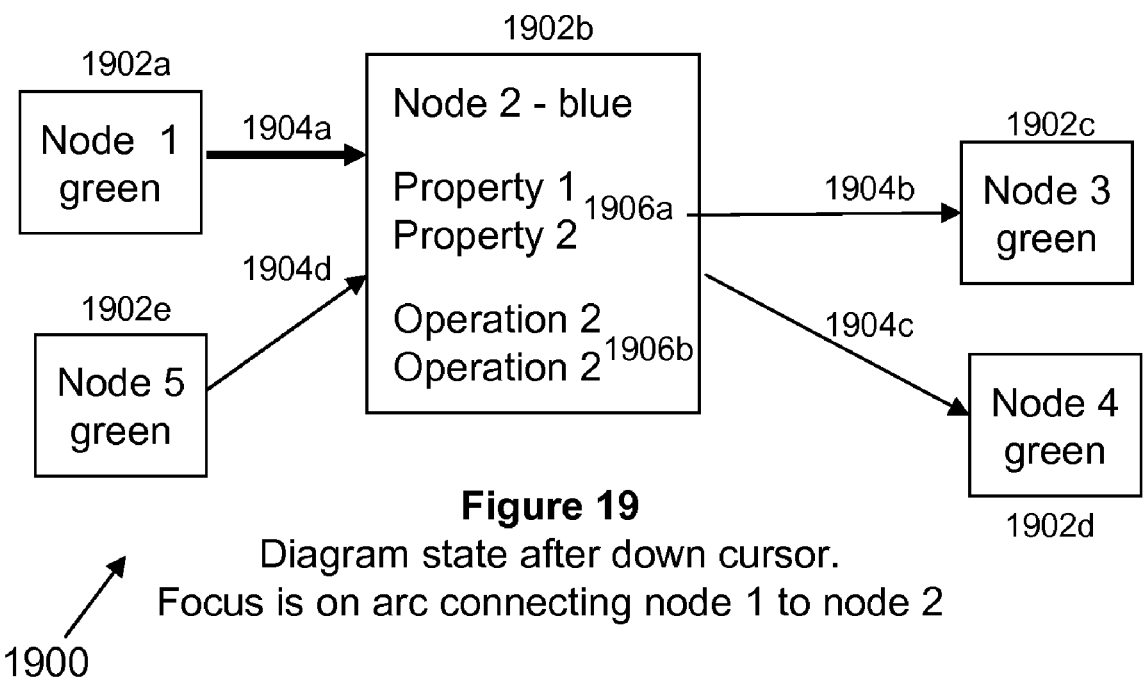
FIG. 19 illustrates a complex visualization where focus is on the arc connecting nodes 1 to node 2.
Figure 20:
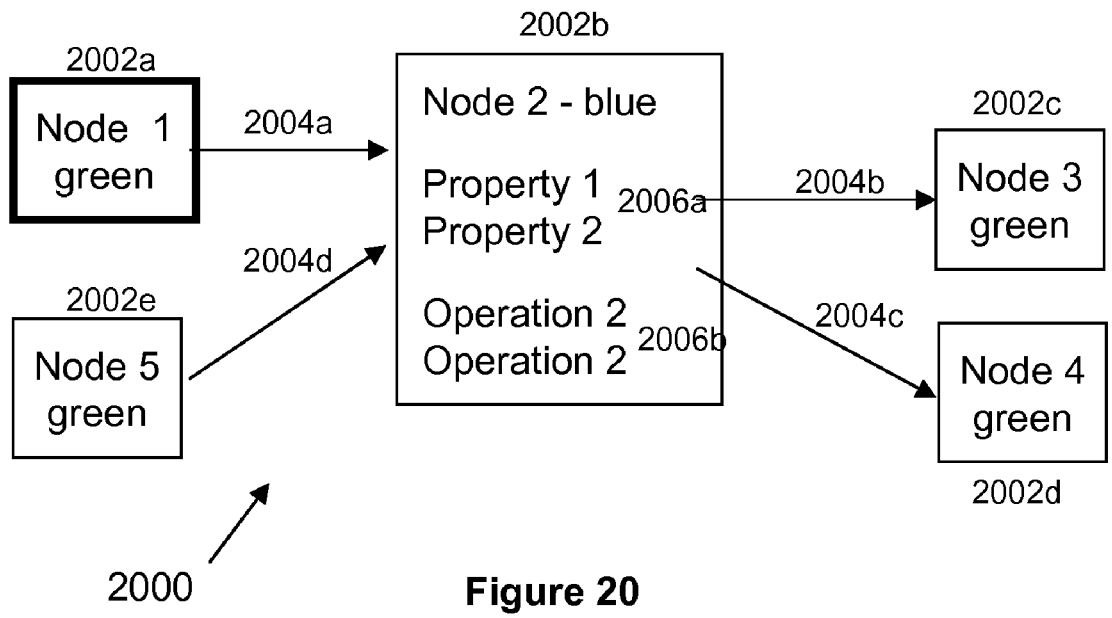
FIG. 20 illustrates a complex visualization where focus is on node 1.
Figure 21:
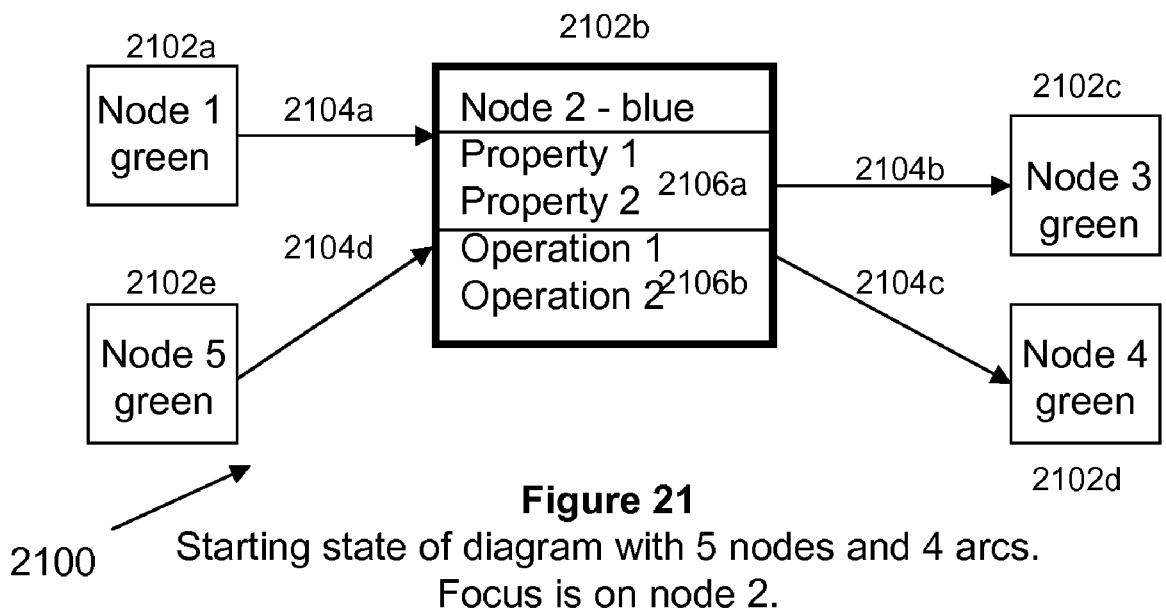
FIG. 21 illustrates a complex visualization where focus is on node 2.
Figure 22:
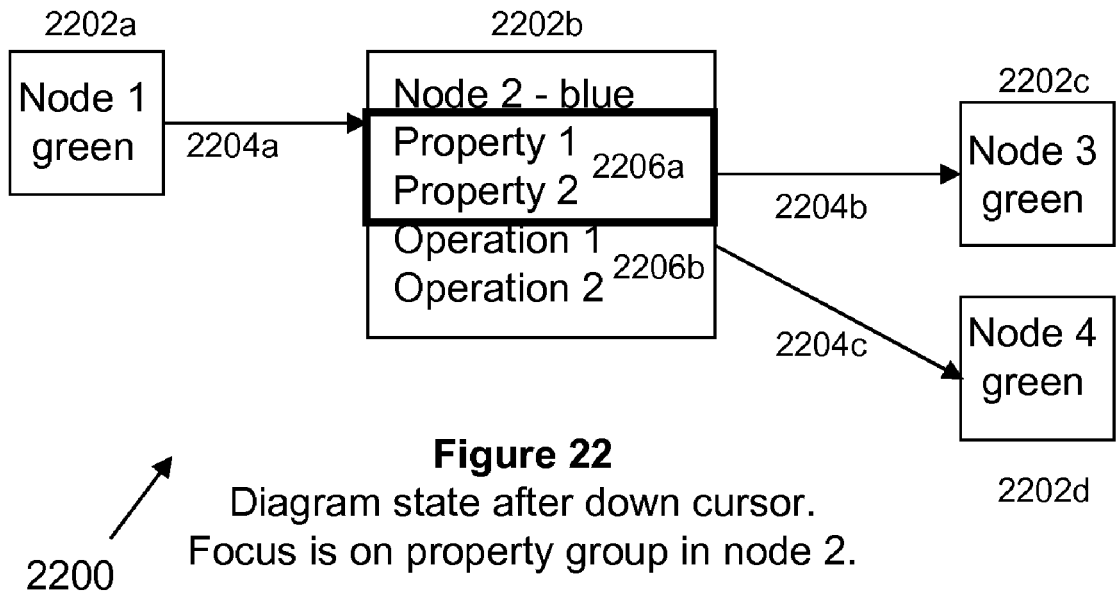
FIG. 22 illustrates a complex visualization where focus is on the property group in node 2.
Figure 23:
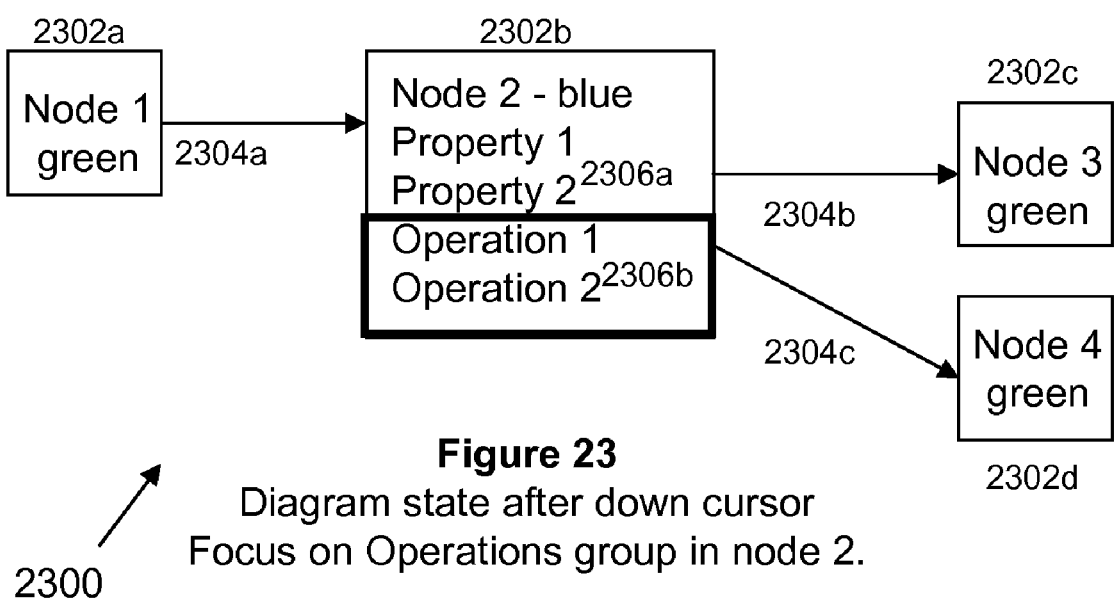
FIG. 23 illustrates a complex visualization where focus is on the operations group in node 2.
Figure 24:
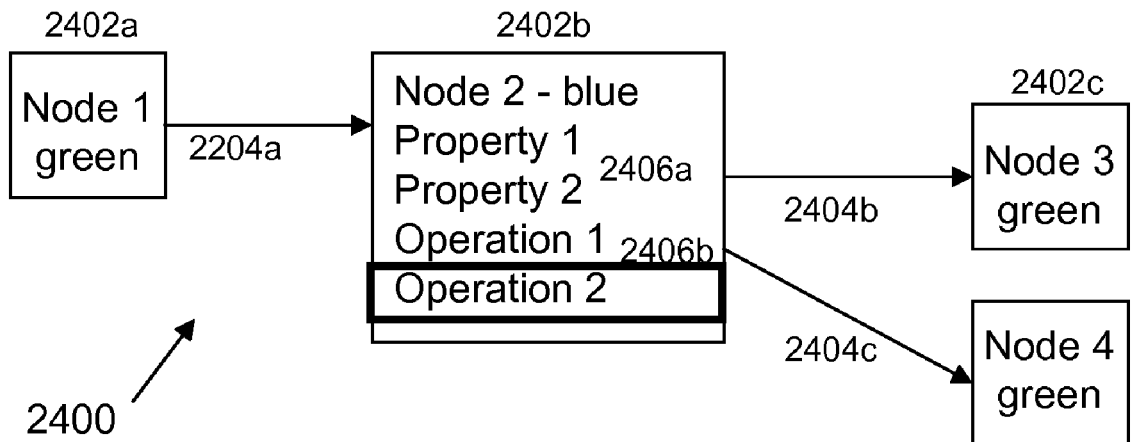
FIG. 24 illustrates a complex visualization where focus is on operation 2 in the operations group in node 2.

Accessible Role: "relationship group"
Accessible Description: "2 incoming relationships from node 1 of type green square and node 5 of type green square"
User input to next diagram: down cursor
FIG. 19 illustrates the diagram 1900 is described in the text below:
  Focus: incoming arc from node 1 to node 2
  Accessible Name: "relationship from node 1 to node 2"
  Accessible Role: "relationship"
  Accessible Description: "relationship from node 1 of type green square to node 2 of type blue square"
  User input to next diagram: left cursor
FIG. 20 illustrates the diagram 2000 is described in the text below:
  Focus: node 1 (2002*a*)
  Accessible Name: "node 1"
  Accessible Role: "green square"
  Accessible Description: "You are on node 1 of type green square. There is 1 outgoing relationship to node 2 of type blue square. This node has 0 properties and 0 operations."
A new example is shown starting from FIG. 21.
FIG. 21 illustrates the diagram 2100 is described in the text below:
  Focus: node 2 (2102*b*)
  Accessible Name: "node 2"
  Accessible Role: "blue square"
  Accessible Description: "You are on node 2 of type blue square. There are 2 incoming relationships from node 1 of type green square and from node 5 of type green square, and 2 outgoing relationships to node 3 of type green square and node 4 of type green square. This node has 2 properties and 2 operations."
  User input to next diagram: down cursor
FIG. 22 illustrates the diagram 2200 is described in the text below:
  Focus: property group
  Accessible Name: "properties"
  Accessible Role: "property group"
  Accessible Description: "there are two properties"
  User input to next diagram: down cursor
FIG. 23 illustrates the diagram 2300 is described in the text below:
  Focus: operation group
  Accessible Name: "operations"
  Accessible Role: "operation group"
  Accessible Description: "there are two operations"
  User input to next diagram: right cursor
FIG. 24 illustrates the diagram 2400 is described in the text below:
  Focus: operation 1
  Accessible Name: "operation 1"
  Accessible Role: "operation"
  Accessible Description: "The operation description entered by the user"

There are two additional approaches to providing navigation that may add value to the approach suggested above.

One approach to providing navigational keys to examine an object's relationships or subordinate objects, and traverse from one object to another, is to create context menu items for each. Navigating to the menu item via standard accessibility methods would voice the name of the related object, and selecting the item would wrap the focus to that object. One potential disadvantage to this approach is that there may be an explosion of menu items depending on the number and type of object relationships. Another is that it may be programatically more difficult to manage the dynamic creation and destruction of these menus on an object's selection than to provide appropriate accessible Names, Roles and Descriptions with the objects themselves along with a reasonable navigational scheme. The usability and viability of this approach needs to be explored on a case by case basis, and depends on the scope of object relationships and the overhead of implementing dynamic menus on the target platform.

Another approach is to provide a dialog with a table of navigable objects. The user invokes a context menu item on the node to raise the dialog, and chooses an object to navigate to from the table. The table contains all the ancillary information (role, description, etc.) that would assist the user in choosing the desired destination object.

Note that in each of these approaches to navigation (cursor keys, menu items and a dialog), the experience for the visually impaired user relying on a speech synthesis device is remarkably similar.

Navigation order of the present invention is established in semantically useful manner based upon the specific application. In many cases this corresponds to the visual ordering of the objects.

Figure 25:
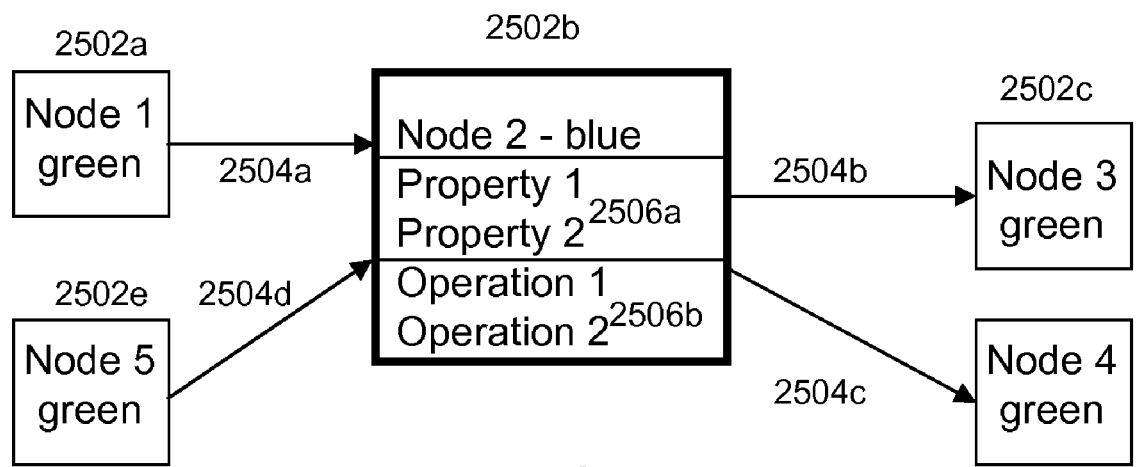
FIG. 25 illustrates a complex visualization where focus is on node 2.
Figure 26:
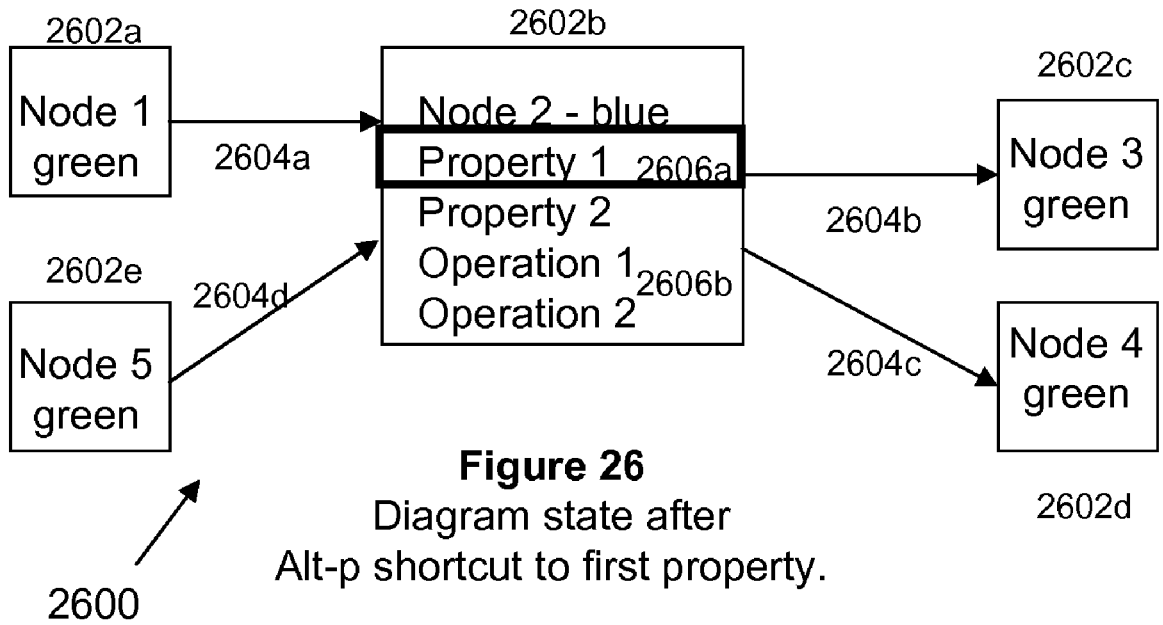
FIG. 26 illustrates a complex visualization where focus is on property in the property group in node 2.
Figure 27:
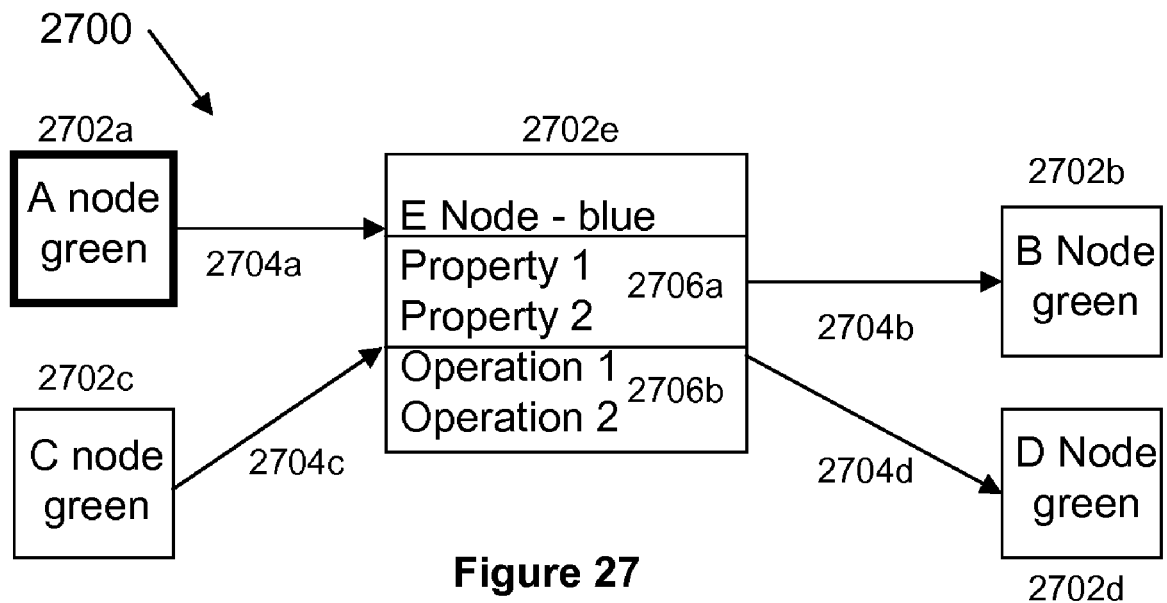
FIG. 27 illustrates a complex visualization where focus is on node 1.
Figure 28:
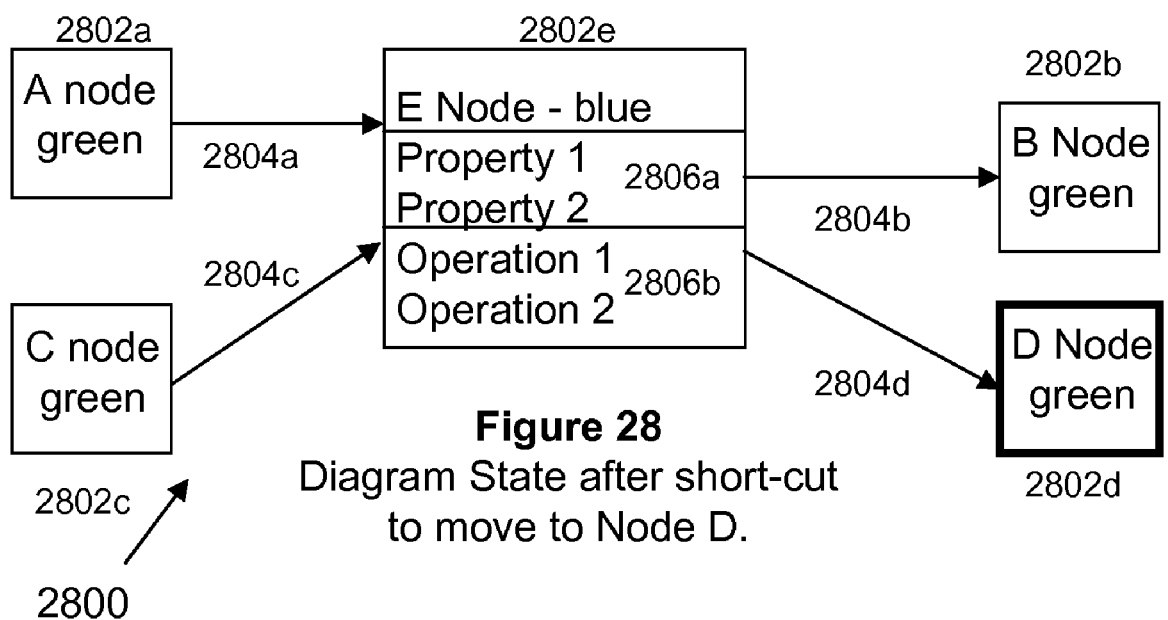
FIG. 28 illustrates a complex visualization where focus is on node D.

Shortcut keys allow all users to more efficiently and effectively navigate the visualization, and provide visually and motor impaired users with an essential navigation tool. If the underlying accessibility architecture does not support setting a shortcut key for voicing through the accessibility toolkit, the accessible Description of an object or object group includes the shortcut key sequence to facilitate learning shortcuts while navigating the visualization. Provide the following shortcut keys:
  To directly access the first object of a child object group of a given node when focus is on the node. (i.e., bypass focus on the object group that the down cursor sets).
Example:
  FIG. 25 illustrates the diagram 2500 is described in the text below:
    Focus: node 2 (2502*b*)
    Accessible Name: "node 2"
    Accessible Role: "blue square"
    Accessible Description: "You are on node 2 of type blue square. There are 2 incoming relationships from node 1 of type green square and node 5 of type green square, and 2 outgoing relationships to node 3 of type green square and node 4 of type green square. This node has 2 properties and 2 operations."
  User input to next diagram: Alt-p (shortcut to first property) which is shown in FIG. 26.
    Focus: property 1
    Accessible Name: "property 1"
    Accessible Role: "property"
    Accessible Description: "Property 1 description entered by the user"
  To navigate directly to a node or arc based on its accessible Name by typing in the first few letters of the name, similar to key navigation in lists.
Example:
  Starting with the diagram in FIG. 27:
    User input to next diagram: Alt-S, D where FIG. 28 illustrates the focus to be node D 2802*d*, "Alt-S" being a short-cut keystroke indicating "go to focus 'node'", "D" representing "Node D".
  Shortcut keys can be used to navigate between the visualization and tool palettes, to allow the user to explicitly mark objects, for example with a number or letter, and to allow them use a special key sequence to quickly return to those objects later on. Similar to shortcuts based on object name, but specified by the user, be used as well.

Where connection points exist in different locations on a node, the connection point's accessible Name and/or Description should state the location of the connection point using compass direction (e.g. North, North-East, East, East-North-East etc.) or the hours on a clock (e.g. 12 o'clock, 3 o'clock, etc.).

Note that describing the relative location of objects in a complex visualization should only be necessary when users are required to specify a location. A more accessible approach would be for the application to automatically choose a connection point based on the existing location of the source object or on some other layout algorithm specific to the application.

An arc that completes a circular relationship between a set of related nodes while clearly visible to the sighted user, must be communicated to the visually impaired user when it is encountered. This fact should be stated in its accessible Description, and in its accessible Role if appropriate.

Whether or not a palette is provided, ensure that there is a context menu that supports the creation of new objects in the visualization. Context menus are more easily accessed and require fewer keystrokes to use than palettes. This is generally not a significant additional burden on the sighted user, as the creation of any object can be managed under a single "New" context menu item.

Creation modes should be avoidable. In modal interfaces, after selecting the tool or menu item to create an arc, the user enters a mode where the first pointer click selects the source node, and the second pointer click selects the destination node. If the user fails to select an object that fulfills the requirements of the operation, the application may show an error dialog or beep, and often remains in the mode until the user selects the right kind of object. Canceling the operation is often not apparent. Performing a modal operation while visually impaired (using the keyboard) can be quite challenging. Instead, to create an arc between two nodes, allow the user to select the two nodes and then initiate a context operation to create an arc between the selected nodes. If the operation fails or is inappropriate to the selection, explain the problem in a popup error dialog and allow the user to begin the operation again.

Allow the user to adjust the keywords used to describe the objects in the accessible Name, Role and Description properties. Support different verbosity levels to allow the proficient user to reduce the amount of time taken to voice the various accessible properties. Note that if screen reader scripts have been written to rely on the keywords used in any of these properties, customization of the keywords may render the scripts unusable.

Screen reader verbosity customization generally filters the accessible information presented (for example by including or excluding certain properties in a widgets spoken text), or by reducing the amount of voiced text introduced by the screen reader itself to identify the properties being voiced. The intent of this guideline is that the application itself allows the user to customize the text generated by the application.

Different operating systems and toolkits may already have schemes in place for navigation and shortcut keys. Applications may need to implement different schemes for different platforms. Keep in mind the existing navigation and shortcut keys on the platform, application environment and the application itself. Try to avoid conflicts with the platform's conventions.

Directed graphs generally do not lend themselves to an alternative representation using typical graphical user interface controls such as trees and tables. That is not to say that such an alternative representation is impossible, only that for the sighted user it is less desirable than a visual approach. For the visually disabled user, the alternative interface should be considered only when careful consideration of the cost of accessibility enablement significantly exceeds the cost of providing an alternative interface. One poor example of an alternative interface is to provide an XML representation of the complex visualization. While such a representation may meet the letter of the law with respect to accessibility, it is hardly usable.

It is impossible for an individual developer to address is the issue of standards for navigating and describing complex visualizations, or to attempt to track the potentially competing "conventions" of different applications. To assist developers in creating usable complex visualizations, and to assist disabled users that use multiple complex visualization applications from different vendors, standards should be elaborated in the following areas:

Navigation. The use of arrow keys and key shortcuts to navigate complex visualizations should be as ubiquitous as control-x, control-c and control-v.

Basic object type naming. Nodes, Arcs, Connection Points, etc. should be the same across applications.

A standard will have the following benefits:

Allow users requiring accessible interfaces to smoothly and efficiently transition between complex visualization applications, and learn to use new complex visualization applications.

ISVs developing complex visualization toolkits can develop to the same standard, provide embedded support for the standard, and make it much easier to develop accessible complex visualizations.

The architectural hurdles to providing accessible interfaces to complex visualizations have been removed on many platforms. The work of providing a usable interface to an accessible visualization is also possible, but is primarily in the hands of the application developer. Using the simple guidelines provided in this article, it is likely that a visually disabled user can be provided with a superior experience when interacting with complex visualizations.

Figure 29:
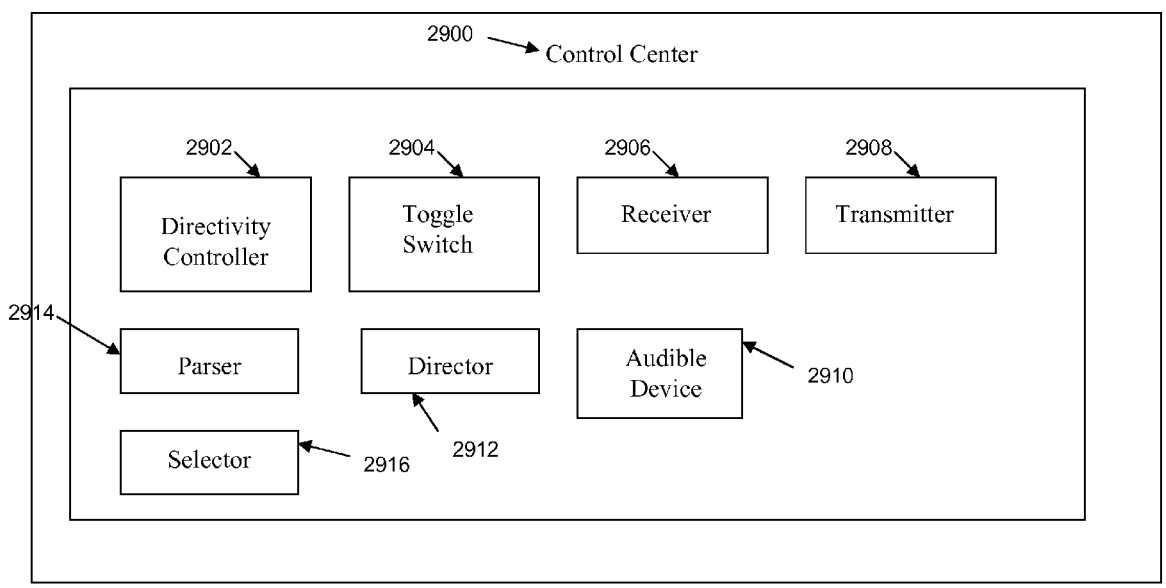
FIG. 29 shows a block diagram of the present invention.

One embodiment of the system of the present invention is shown in FIG. 29. It has a Control Center 2900, a Directivity Detector 2902, a Toggle Receiver 2904, a Receiver 2906, a Transmitter 2908, a Non-Visual Indicating Device 2910, a Director 2912, a Parser 2914 and a Selector 2916. The Control Center 2900 receives the Node Characteristics via the Receiver 2906. The Parser 2914 parses the Node Characteristics and passes those to the Director 2912. The Director 2912 examines the Node Characteristics and passes them to the Non-Visual Indicating Device 2910 for indicating to the non-visual user. Based upon commands from the non-visual user by way of the non-visual prompts by the Prompter 2918, the Director 2912 indicates to the Selector 2916 to move to the next node, object or property. The Non-Visual Device 2910 indicates to the non-visual user the name of the node, according to the name characteristic, the property characteristic, according to the property characteristics, the operation characteristic, according to the operation characteristics, or the action taken such as moving to the next node, according to the directivity characteristic.

In view of the foregoing, a need exists to overcome these problems by providing a system and method for improving the navigation of complex visualizations for the visually impaired.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for improving navigation of complex visualizations for the visually impaired in a system having a display for illustrating nodes, each node having characteristics, the system having a plurality of toggle switches for receiving toggle commands from a user for toggling between the characteristics of each node and for selecting at least one of the characteristics, the method comprising:

obtaining the characteristics of the nodes, the characteristics including, for each node: any incoming arcs to the node from other nodes; any outgoing arcs from the node to other nodes; any properties of the node; and any operations of the node;

navigating to a selected one of the nodes using at least one of the toggle switches;

verbally indicating to the user information regarding the selected node, the information comprising: a name of the selected node; a description of at least one of the properties of the selected node; a description of at least one of the operations of the selected node; a description of at least one of the incoming arcs to the selected node, and a description of at least one of the outgoing arcs from the selected node;

receiving toggle commands from the toggle switches to toggle between the characteristics of the selected node and to select one of the characteristics of the selected node;

verbally indicating to the user the selected characteristic; and receiving a toggle command from the toggle switches to act upon the selected characteristic.

2. The method of claim 1 further comprising selecting a property for changing by navigating to one of the nodes using the toggle switches and changing the property.

3. The method of claim 1, wherein the toggle switches comprise a left cursor key and a right cursor key, the method further comprising navigating between nodes using the left cursor key and the right cursor key.

4. The method of claim 1, wherein at least one of the nodes comprises a group of incoming arcs or a group of outgoing arcs, the method further comprising: giving focus to the group of incoming arcs or the group of outgoing arcs using a left cursor key and a right cursor key, respectively.

5. The method of claim 4, wherein the toggle switches further comprise an up cursor key and a down cursor key, the method further comprising:

navigating between the arcs in the group of arcs having focus using the up cursor key and the down cursor key.

6. The method of claim 1, wherein the toggle switches comprise a left cursor key, a left cursor key, an up cursor key, and a down cursor key.

7. The method claim 1, wherein the toggle switches further comprise an up cursor key and a down cursor key, the method further comprising:

navigating between a group of the properties of the selected node and a group of the operations of the selected node using the up cursor key and the down cursor key.

8. The method claim 7, wherein the toggle switches further comprise a left cursor key and a right cursor key, the method further comprising:

navigating between the properties in the group of the properties of the selected node using the left cursor key and the right cursor key; and navigating between the operations in the group of the operations of the selected node using the left cursor key and the right cursor key.

* * * * *